United States Patent
Morris et al.

(10) Patent No.: US 10,113,622 B2
(45) Date of Patent: Oct. 30, 2018

(54) INTEGRALLY DRIVEN LINKAGE FOR INDUSTRIAL/COMMERCIAL EQUIPMENT

(71) Applicant: Nor-Tech Industrial Corp., Alpena, MI (US)

(72) Inventors: Jerome H. Morris, Alpena, MI (US); John A. Radtke, Alpena, MI (US); Scott M. Kelly, Fort Myers, FL (US); Chris A. Hatch, Herron, MI (US); Edward H. Sanders, Sarasota, FL (US); R. Luke McMurray, Hillman, MI (US)

(73) Assignee: Nor-Tech Industrial Corp., Alpena, MI (US)

( * ) Notice: Subject to any disclaimer, the term of this patent is extended or adjusted under 35 U.S.C. 154(b) by 141 days.

(21) Appl. No.: 15/451,480

(22) Filed: Mar. 7, 2017

(65) Prior Publication Data

US 2018/0259046 A1    Sep. 13, 2018

(51) Int. Cl.
| | |
|---|---|
| *F16H 7/00* | (2006.01) |
| *F16H 35/06* | (2006.01) |
| *F16H 7/02* | (2006.01) |
| *F16H 7/06* | (2006.01) |
| *F16H 7/04* | (2006.01) |
| *B65G 23/24* | (2006.01) |

(52) U.S. Cl.
CPC ............ *F16H 35/06* (2013.01); *B65G 23/24* (2013.01); *F16H 7/02* (2013.01); *F16H 7/04* (2013.01); *F16H 7/06* (2013.01)

(58) Field of Classification Search
CPC ........... F16H 7/02; A01D 29/00; A01D 41/04; B42C 19/08; B65G 13/07
USPC ............................................................ 474/88
See application file for complete search history.

(56) References Cited

U.S. PATENT DOCUMENTS

| | | | | |
|---|---|---|---|---|
| 204,969 | A | * | 6/1878 | Hall .......................... F16H 7/02 474/87 |
| 242,256 | A | * | 5/1881 | Boothroyd ................ F16H 7/02 474/88 |
| 2,707,618 | A | * | 5/1955 | Brown ...................... E21B 3/02 474/86 |
| 3,404,517 | A | * | 10/1968 | Whitfied ................ A01D 29/00 460/128 |

(Continued)

*Primary Examiner* — Henry Y Liu
(74) *Attorney, Agent, or Firm* — Warner Norcross + Judd LLP (57) ABSTRACT

An integrally driven linkage for a conveyor system is provided. The integrally driven linkage includes inner and outer links, an axle upon which bearings are placed to support a two stage pulley arrangement and a multitude of additional axles which carry bearings and two position sheaves which carry daisy chained belt loops from one axle to the next. Cables and hoses may be externally attached at each outside link thereby providing a functional cable carrying device. The outside links may be stepped to prevent radial motion in one or more direction and/or to limit radial motion. The integrally driven linkage may be used for virtually any industrial or commercial application where mechanical and control energy is needed for non-stationary equipment, and is not limited to conveyor systems but may be applied to virtually any electro-mechanical device, including but not limited to pneumatic and hydraulic devices.

26 Claims, 6 Drawing Sheets

(56) References Cited

U.S. PATENT DOCUMENTS

| | | | | |
|---|---|---|---|---|
| 4,271,960 A | * | 6/1981 | Chalich | B65G 17/063 |
| | | | | 198/779 |
| 4,611,801 A | * | 9/1986 | Pessina | B42C 19/08 |
| | | | | 198/419.2 |
| 5,056,653 A | * | 10/1991 | Lancaster | B65G 13/07 |
| | | | | 198/789 |
| 5,224,584 A | * | 7/1993 | Best | B65G 13/07 |
| | | | | 193/35 TE |
| 5,360,100 A | * | 11/1994 | Bourgeois | B65G 13/07 |
| | | | | 198/790 |
| 7,882,944 B1 | * | 2/2011 | Eubanks | B65G 13/07 |
| | | | | 198/790 |

* cited by examiner

INTEGRALLY DRIVEN LINKAGE FOR INDUSTRIAL/COMMERCIAL EQUIPMENT

BACKGROUND OF THE INVENTION

The present invention relates to an integrally driven linkage for transferring power from a drive source to a target machine which may be used with industrial and/or commercial equipment, including material handling devices.

Machinery, typically equipped with a drive system which may include mechanical drives, control systems, hydraulically powered devices and pneumatically powered devices and is widely used in industrial and commercial applications. The manufacturing process frequently demands several independent machines acting in concert to achieve acceptable product results. Therefore, each piece of equipment is typically linked through controls interlocks to cause a plurality of equipment to behave as if it were a single machine. Further, each element typically uses its own drive and power source.

Despite the widespread acceptance of such groupings of equipment the cost of the equipment is excessive due to redundancy in the number and style of the various drive systems required for each piece of equipment. To illustrate, it can be expensive to provide a separate motor, transmission and control system for each machine in a grouping. The cost is compounded as additional machines are incorporated into the grouping.

In some applications, power from a single power source is provided to a plurality of different machines. There are a wide range of complex transmission and power dividing components used in connection with industrial and commercial equipment. The complexity of conventional power distribution systems makes them impractical for many applications. This can be particularly true when the drive source and the destination machine move relative to one another.

SUMMARY OF THE INVENTION

The present invention provides an integrally driven linkage for transferring power from an input at one end of the linkage through the links to an output at the opposite end. For example, one end of the linkage may be coupled to a drive source and the opposite end may be couple to a target machine. The integrally driven linkage includes a plurality of links arranged in a chain-like series with each successive link operatively coupled to the next. In one embodiment, the links include a series of rotating elements, such as a pulley, gear or sprocket, that are joined to one another by drive elements, such as a belts or chains. The rotating elements and drive elements are arranged so that rotation of one element results in rotation of the other. In one embodiment, each rotating element includes an input portion that is driven by an upstream drive element and an output portion that drives a downstream drive element.

In one aspect of the invention, an integrally driven linkage for a conveyor system is provided. The integrally driven linkage includes components resembling a roller chain with each roller being a double pulley, allowing two belts to be attached, and continuing from one roller to the next. For example, an incoming belt or drive belt may be coupled to one of the double pulleys to receive input power from an upstream link and an outgoing belt or driven belt may be coupled to the other of the double pulleys to transfer power to a downstream link. This then, allows a mechanical rotary motion from link to link for the length of the linkage and a standard motorized rotary action can drive the first roller and the sequence of belts can drive all other rollers to the end of the linkage.

In one embodiment, the linkage may include an alternating assembly of inside links and outer connecting links that are connected together for the length of the linkage. The inside links may include a pair of spaced-apart rotating elements, such as sheaves or sprockets, that are mounted adjacent to one another. The outside links may join adjacent inside links. The connections between the inside links and outside links may permit pivotal movement between adjacent links, thereby providing the linkage with the ability to articulate along its length.

In one embodiment, the sides of the linkage may be configured to provide control over the direction and amount of articulation along the linkage. For example, the sides of the linkage may include machined surfaces which allow each link to pivot relative to the next in one direction only, the result being a linkage that can articulate from a straight section to a curved section but in one direction only.

In one embodiment, the integrally driven linkage, made to include belting and pulleys, is large enough to attach flexible cables, hoses and conduits from the fixed position of the primary drive source to a secondary piece of equipment that needs rotary power and perhaps electrical and/or pneumatic and hydraulic hoses and that secondary piece of equipment would be bi-directionally moveable in two planes, thereby allowing the second piece of equipment to perform its tasks by using the power developed at the first piece of equipment.

In one embodiment, several such linkages may be mounted on a single rotating shaft delivering mechanical power to several pieces of equipment and each of these linkages may be engaged or disengaged via electric or pneumatic clutch/brakes to control separate functions on two or more additional pieces of equipment.

In another embodiment, the rotating elements or rollers could be sprockets driving chains within the carrier achieving the same result.

In another embodiment, the side plates of the carrier may be machined in such a manner as to allow a portion of the carrier to form a radius in its path as perceived by a view from the side of the carrier and the remaining side plates of the carrier may be machined to allow the same carrier to form a radius in the opposite direction as seen in the first section of the carrier.

The present invention provides a simple and effective drive linkage that can be used to transfer power from one component to another. Use of the integrally driven linkage may minimize energy requirements and promote efficiency. The present invention may be implemented from generally conventional components, such as belts/pulleys or sprockets/chains, and can therefore be manufactured with relatively low cost. The linkage may be implemented to allow bidirectional transfer of power, as desired. The linkage includes a plurality of links that are capable of pivoting with respect to one another, thereby providing a driven linkage that can articulate (e.g. bend or flex) as needed to traverse obstacles and bridge between components at a wide range of different relative positions. The articulating linkage also allows transfer of power between components that move relative to one another during operation. The linkage can be configured to provide controlled articulation. The linkage may be implemented using a wide range of rotating elements (e.g. pulleys, sheaves, sprockets) and a wide range of drive elements (e.g. belts, pulleys, chains, cables) selected to meet the desired performance characteristics. The linkage may also include integrated conduits for routing accessories, such as wires, air supply lines and hydraulic fluid supply lines, along the linkage.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF THE CURRENT EMBODIMENT

I. Overview.

Figure 1:
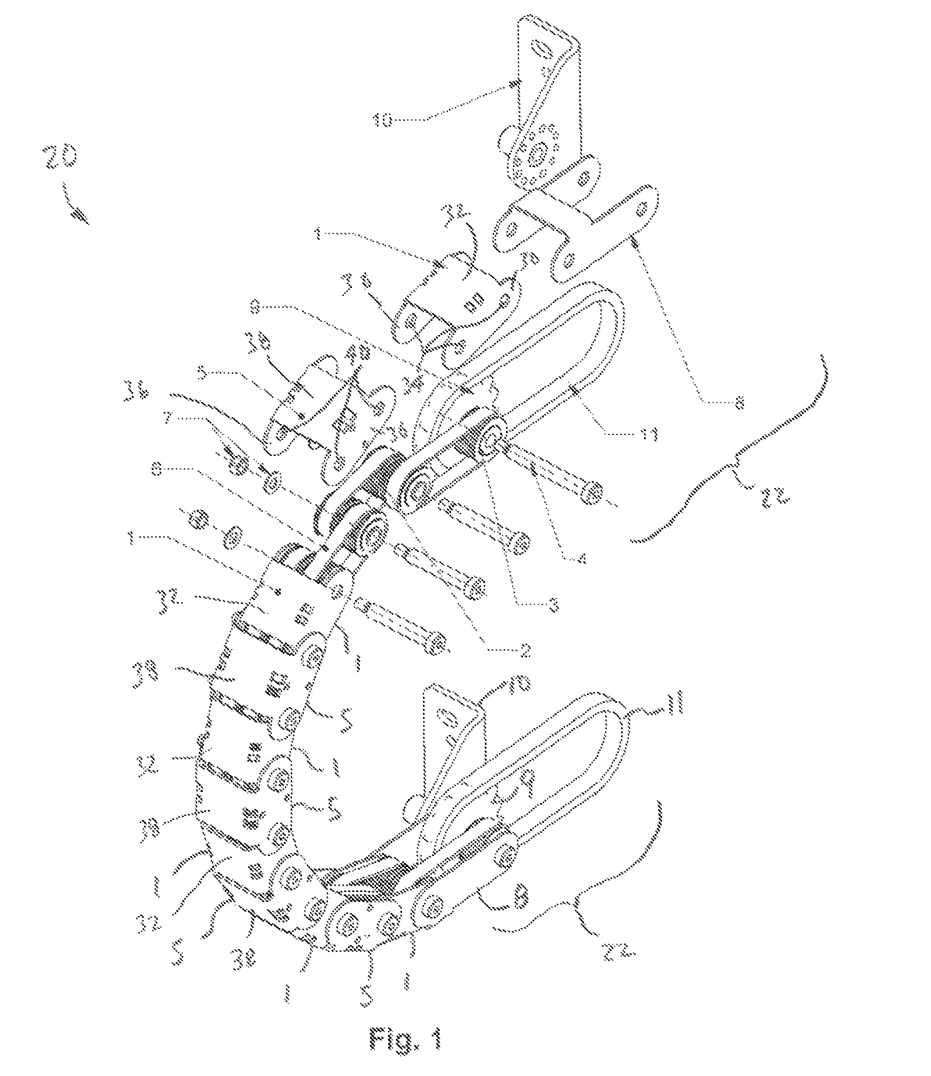
FIG. 1 is an isometric view of the integral driven linkage configuration in accordance with a first embodiment of the present invention.
Figure 2:
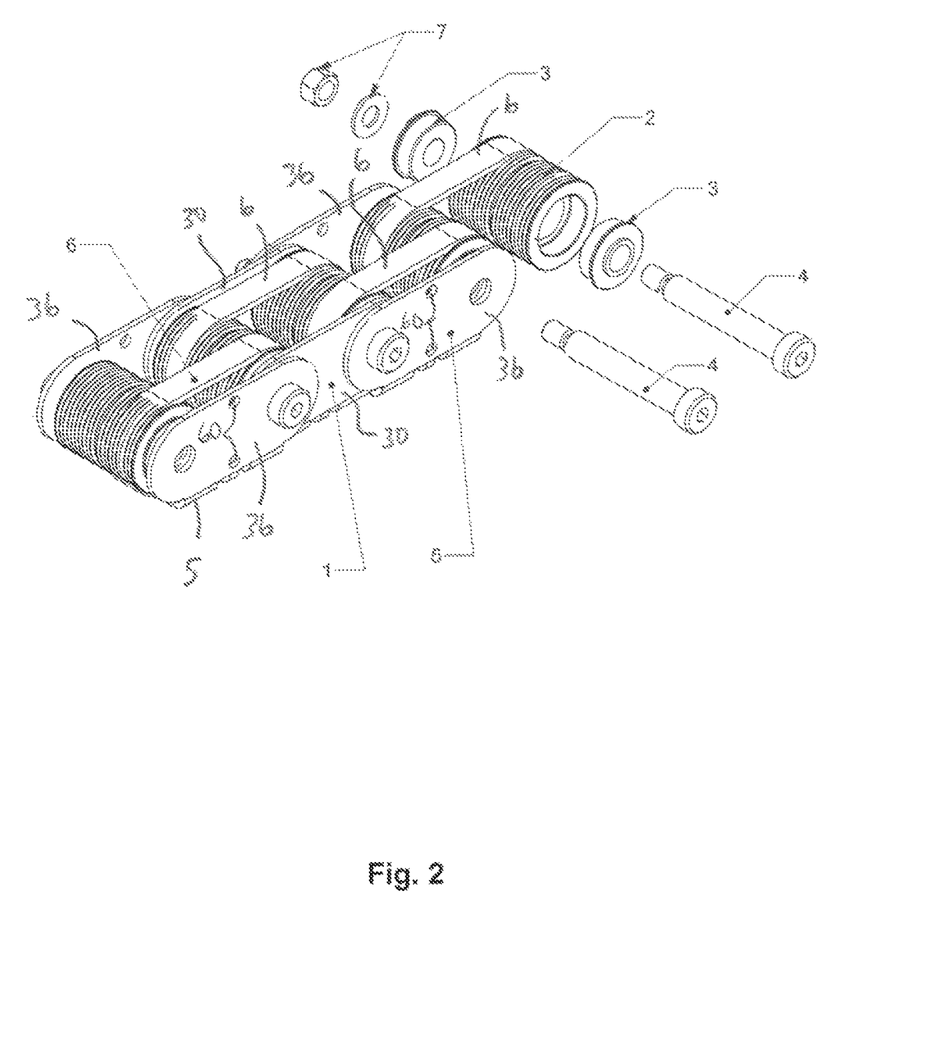
FIG. 2 is an isometric view with exploded components of the primary or basic building blocks used to create other embodiments of the integrally driven linkage configurations or larger mechanisms.
Figure 3:
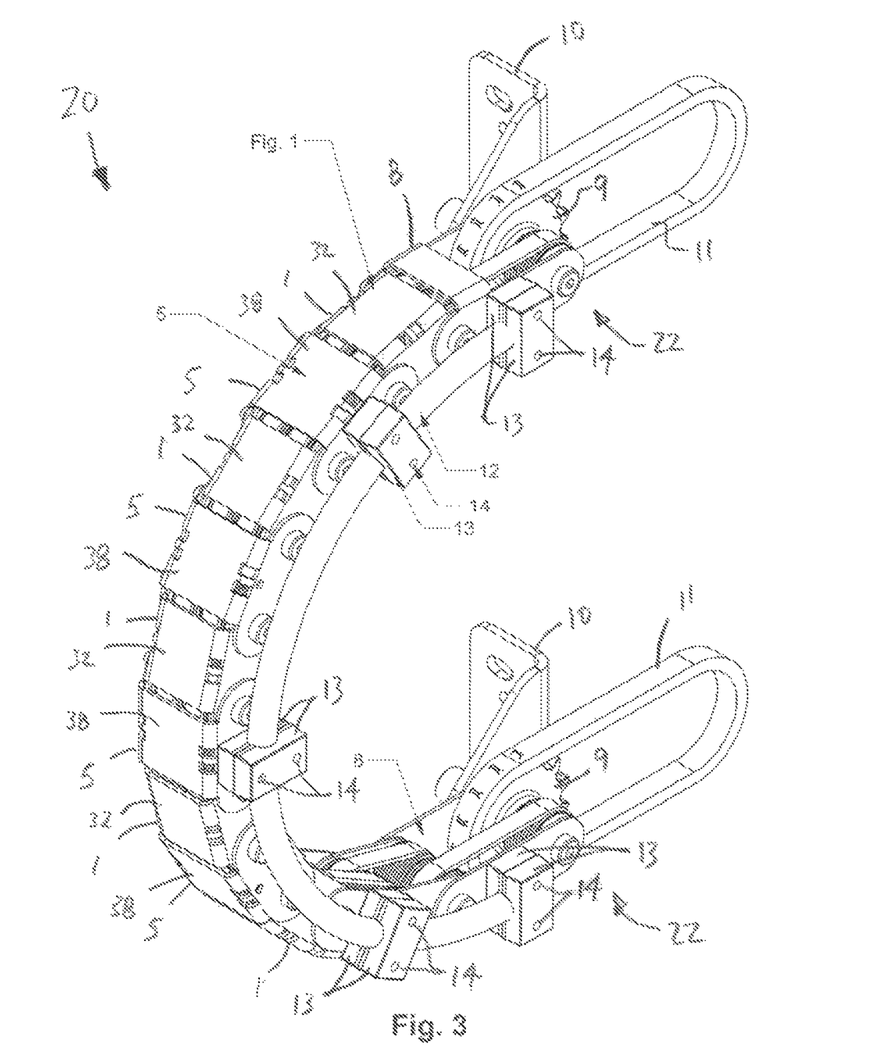
FIG. 3 is an enhanced embodiment of FIG. 1, showing multiple views of how optional flexible conduit can be mounted to the outside links of the integrally driven linkage. This conduit provides the means to deliver pneumatic, hydraulic or electrical utilities to enhance or control the secondary device being served.
Figure 4:
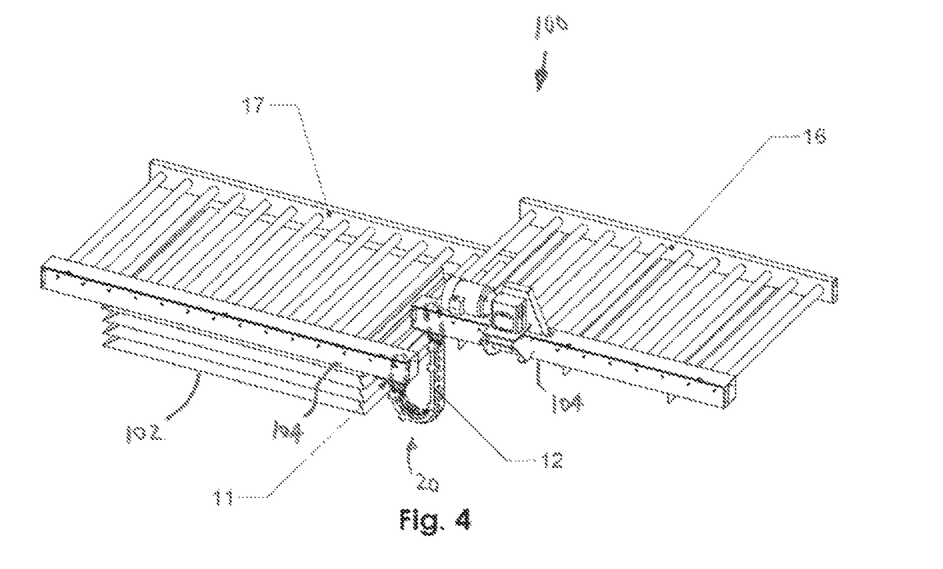
FIG. 4 shows an isometric view of the integral driven linkage configuration shown in FIG. 1 in a practical application. The embodiment shows a stationary conveyor, with a drive package, transferring potential energy thru the integrally driven linkage to a (vertically) reciprocating conveyor mounted atop a scissor lift table.
Figure 5:
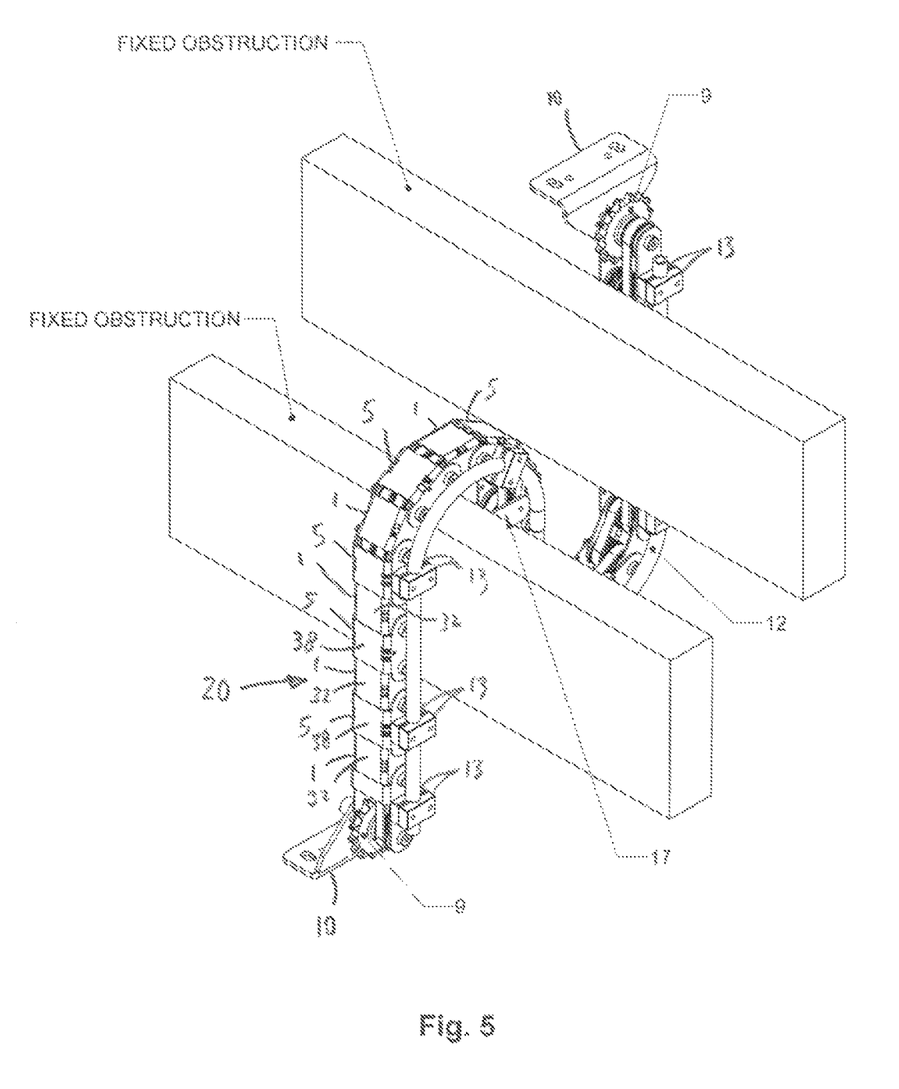
FIG. 5 shows and additional configuration of FIG. 3. This view illustrates the ability of the integrally driven linkage to serpentine through a congested area while allowing vertical and or lineal movement of the components while sharing mechanical energy between the two.
Figure 6:
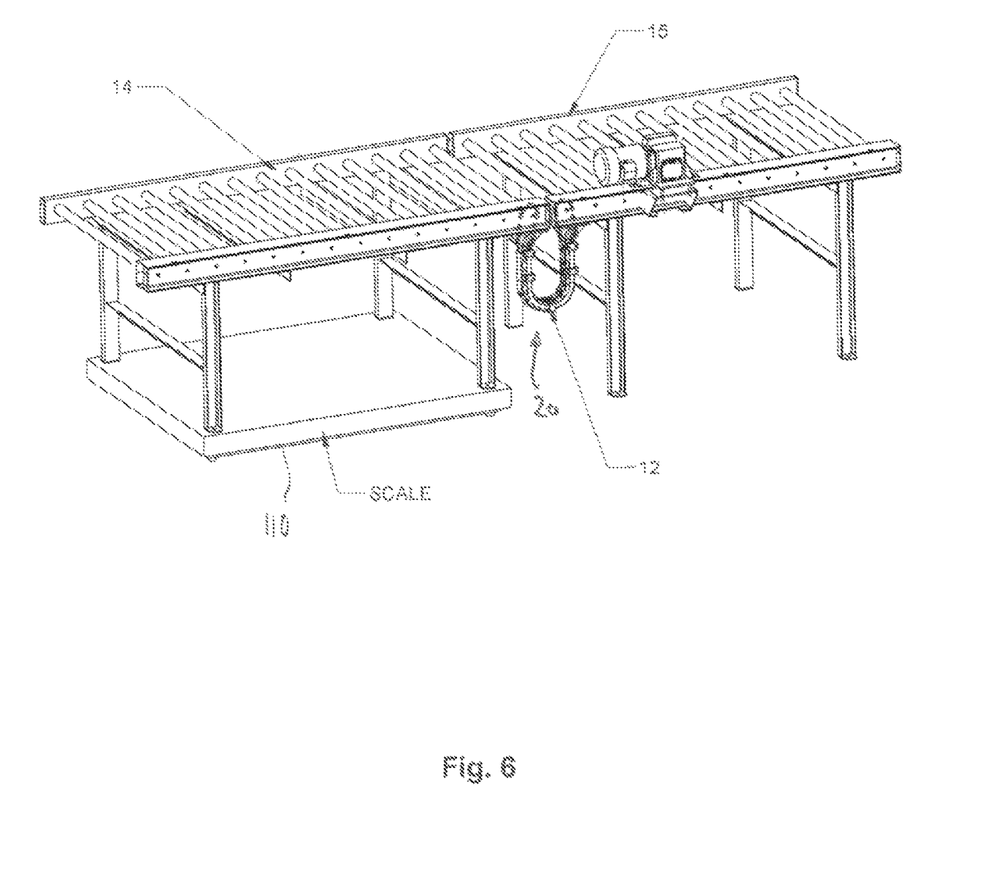
FIG. 6 shows and isometric view of the integral driven linkage configuration shown in FIG. 1 in a practical application. The embodiment shows a conveyor with scale load cells and the offloading stationary conveyor, with a drive package, transferring potential energy thru the integrally driven linkage.

An integrally driven linkage 20 in accordance with an illustrated embodiment of the present invention is shown in FIGS. 1-3. The integrally driven linkage 20 generally includes a plurality of rotating elements 2, such as pulleys, gears or sprockets, joined in a continuous series by a plurality of drive elements 6, such as belts, chains, cables or ropes. In one embodiment, each rotating element 2 is configured to receive two drive elements 6—an incoming drive element that receives motion from the adjacent upstream rotating element and an outgoing drive element that transfers the received motion to the adjacent downstream rotating element. The rotating elements 2 are rotatably supported by a chain-like structure of interfitting links. The links may be configured to pivot with respect to one another, thereby giving the linkage the ability to articulate. In the embodiment of FIG. 1, the linkage 20 includes inside links 1 and outside links 5 that are connected together to cooperatively provide a mechanical structure for the rotating elements 2. In the illustrated embodiment, the inside links 1 receive axles 4 that are configured to receive the rotating elements 2. The rotating elements 2 may be supported by bearings 3. The outside links 5 are configured to join adjacent inside links 1. As shown in FIGS. 4 and 6, the present invention may be used in a conveyor system to transfer mechanical power from one conveyor segment to another. The articulating nature of the linkage 20 allows it to traverse obstacles as shown in FIG. 5 and to transfer power between components that move relative to one another during operation.

Although described in the context of conveyor applications, the integrally driven linkage 20 may be incorporated in to a wide range of applications in which it is desirable to provide an enclosed mechanical linkage from a drive source to a driven destination, such as a target machine. The present invention can be particularly beneficial in applications where it is desirable for the linkage to bend or snake around obstacles, or where the drive source and driven destination move relative to one another during operation. In the illustrated embodiment, the linkage is configured to receive input from a source of rotational motion and to provide rotational output, but it should be noted that the linkage may include structure for receiving or outputting others forms of motion, such as reciprocating linear motion. For example, the input end of the linkage may include a crank or Scotch yoke that converts reciprocating motion into rotary motion. Similarly, the output end of the linkage may be coupled to a crank or Scotch yoke to convert the rotary motion within the linkage into reciprocating output motion. Further, the present invention is illustrated in the context of a single integrally driven linkage driven by a single source of power. The present invention may alternatively be incorporated into applications in which a plurality of integrally driven linkages are powered by a single input source. This may allow a single input source to drive a plurality of target machines. In applications of this type, the system may include electric or pneumatic clutch/brakes that engage or disengage the linkages to control separate functions on two or more additional pieces of equipment.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

II. Integrally Driven Linkage.

An integrally drive linkage 20 in accordance with an embodiment of the present invention will now be described in more detail with reference to FIGS. 1-6. In accordance with a first embodiment, an integrally driven linkage 20 for transference of kinetic or dynamic energy, by mechanical structure, between two otherwise unconnected devices is illustrated in FIGS. 1-3. The configuration shown in FIG. 1 is representative of a typical assembly used in the transmission of mechanical energy, but the design and configuration may vary from application to application. The primary or basic building blocks of the illustrated embodiment can be further explained by examining FIG. 2. One of these primary building blocks is the injection molded and or fabricated inside link 1 which provides a rigid housing for the pulley 2 (e.g. a sheave or sprocket), the internal bearings 3, threaded axle 4, the secondary element that connects the center links together is the outside link 5, the drive element 6 (e.g. a belts or chain) and nut and washer 7. The inside links 1 of the illustrated embodiment include side plates 30 joined together by a bridge section 32. The side plates 30 of the inside links 1 define openings 34 configured to receive the threaded axles 4. The inside links 1 and aforementioned housed components are then connected to one another by attaching injection molded or machined outside link plates 5, which are designed to hold tight tolerances between inside links 1 as well as center/center distance but are secured with axle 4 and nut and washer 7. The nut and washer 7 are merely exemplary and the axles 4 may be secured using essentially any suitable structure. For example, the axles may be pins (hollow or solid) or rivets and opposite ends of the axles may be enlarged or otherwise deformed to secure them in place. The outside links 5 of the illustrated embodiment include side plates 36 joined together by a bridge section 38. The bridge section 38 of the outside links 5 is slightly longer than the bridge section 38 of the inside links 1 so that the side plates 36 of the outside links 5 are disposed adjacent the side plates 30 of the inside links 1. As shown, the side plates 36 of the outside links 5 define openings 40 configured to receive the threaded axles 4. Although the inside links 1 and outside links 5 of the illustrated embodiment may be injection molded, they need not be injection molded and may be manufactured using essentially any suitable materials and fabrication techniques. Alternating the installation pattern of the drive elements 6 provides the structure of transferring the torque between the pulleys 2. Utilizing these primary building blocks and repeating this assembly process will define the integrally driven linkage structure as shown in configuration in FIG. 1.

In the illustrated embodiment, the linkage 20 is configured to allow a certain degree of control over flexing/bending of the linkage along its length. In the illustrated embodiment, the inside links 1 and the outside links 5 are configured to mechanically engage one another to prevent flexing/bending beyond the point of engagement. More specifically, the inside links 1 and outside links 5 of the illustrated embodiment are configured so that their bridge sections 32 and 38 abut or otherwise engage one another when the linkage 20 is straightened. This prevents further bending in the direction of the bridge sections 32 and 38, but allows bending in the opposite direction. As perhaps best shown in FIG. 5, the outside links 5 have been designed to rigidly lock the inside links 1 in one direction and allow the linkage assemblage to bend in the opposite direction or even multiple directions by simply alternating (reversing) the installment of the inside links 1 and outside links 5. In alternative applications, the inside links 1 and/or outside links 5 may be formed without the bridge sections 32 and 38. For example, the bridge section 32 and 38 on the inside links 1 and/or outside links 5 can be eliminated when it is desirable to allow the linkage to articulate freely in both directions. As another example, the bridge sections may be eliminated in one or more portions of the linkage to allow some regions of free flexibility and other regions of limited flexibility. As an alternative to eliminating the bridge sections, the bridge sections may be configured so that they do not engage one another throughout the desired range of motion of linkage 20. To illustrate, the bridge sections may be reduced in width or the links may be reconfigured so that the bridge sections of the inside and outside links are offset and do not engage throughout the desired range of motion. With the illustrated embodiment, free articulation may be provided by orienting the inside links 1 and outside links 5 so that their bridge sections are on opposite sides of the linkage 20 and therefore do not abut during normal articulation. Although the illustrated embodiment utilizes the bridge sections 32 and 38 to selectively limit articulation of the linkage 20, alternative mechanical structure may be used to provide this function. For example, the side plates of the inside links 1 and/or the outside links 5 may have features, such as bends or protrusions, that mechanically limit relative motion between the inside links 1 and the outside links 5.

In the illustrated embodiment, the linkage 20 includes transition assemblies 22 at opposite ends to connect the input end of the linkage with an input component and the output end of the linkage to the driven component. As shown in FIG. 1, the two transition assemblies 22 may be generally identical, but they may vary depending on the configuration of the drive source and the driven destination. In the illustrated embodiment, each transition assembly 22 includes a transition rotating element 9 that is rotatably coupled to a rotating element 2. The transition rotating element 9 of the illustrated embodiment is a generally conventional sprocket, but it may be essentially any rotating element. The transition rotating element 9 is coupled to the drive source by a transition drive element 11. In the illustrated embodiment, the transition drive element 11 is a belt or chain. Installing the drive elements 11 at opposite ends of the linkage 20 establishes the final connections between the two devices (e.g. the drive source and the driven destination) that utilize the integrally driven linkage 20 to transmit energy by mechanical transmission. Once the desired length of the integrally driven linkage has been established, which is a variable based on needs of the end user, the transition or infield connections can be chosen and mounted. The outside links 5 and the outside link transition plates 8 have been designed to accept a variety of integrally driven linkage termination mounting hardware thereby providing for easy integration between a range of devices that need to be linked together to share mechanical energy. The embodiment of FIG. 1 shows examples of injection molded or fabricated outside link adaptor link 8 designed specifically to support a transition sheave/sprocket 9 combination and integral driven linkage termination mount 10 which are secured by readily available fasteners. Although this embodiment includes an adaptor link 8 that differs from the outside links 5, the adaptor link 8 may be identical to the outside links 5. The illustrated termination mount 10 may be replaced by essentially any mounting structure suitable for supporting the end of the linkage 20.

As noted above, the rotating elements 2 of the illustrated embodiments are pulleys, such as grooved sheaves, but may be essentially any rotating element capable of implementing the desired transmission of power from an input drive element to an output drive element. For example, the rotating elements may be pulleys, double pulleys, sheaves, double sheaves, sprockets, double sprockets, wheels or drums. The pulleys may be grooved, if desired. For example, in the illustrated embodiment the sheaves are circumferentially grooved. They may alternatively be axially grooved (e.g. timing belt pulley) or non-grooved. In the illustrated embodiment, the rotating elements include a pair of grooved sheaves 2 positioned adjacent to one another on each axle 4. The two sheaves 2 are joined to one another (or formed integrally) to form a two-stage sheave configured so that rotation of one grooved sheave 2 results in rotation of the other. Each grooved sheave 2 of is wide enough to carry a single drive element 6. To facilitate smooth and easy rotation, the rotating elements 2 include internal bearings 3. In the illustrated embodiment, each two-stage sheave 2 is fitted over its corresponding axle 4 and is supported by a pair of internal bearings 3. As shown in FIG. 2, the bearings 3 are fitted into the two-stage sheave 2 from opposite sides with the inner surface of each bearing 3 engaging the outer surface of the axle 4 and the outside surface of each bearing 3 engaging the inner surface of the two-stage sheave 2. Although shown with bearings 3, the present invention may be implemented with essentially alternative construction that provides for adequate rotation of the rotating elements 2. For example, the bearings may be replaced by bushings (such as self-lubricated bushings) or friction reduction coatings. In the illustrated embodiments, the rotating elements 2 are configured to rotate about the axles 4. Other configuration may be employed. For example, in alternative applications, the rotating elements may be integral with the axle, and the axle may rotate with respect to the links. In applications of this type, bearings, bushings or other friction reduction components may be fitted between the axle and the links (e.g. inside links and/or outside links).

In the illustrated embodiment, the drive elements 6 are belts that are configured to transmit the rotational power from one grooved sheave 2 to the next grooved sheave 2 in the integrally driven linkage and to every grooved sheave 2 thereafter by virtue of a series of drive elements 6 which are mounted, for example, first on the left side of the linkage 20 and driving the left side grooved sheave 2 and then on the right side of the linkage 20 causing the right grooved sheave 2 to rotate then continuing in the series and so forth to the end of the integrally driven linkage 20. This arrangement may be most clearly demonstrated by viewing FIG. 2. Although the drive elements 6 of the illustrated embodiments are belts 6, the drive elements may be replaced by other components, such as chains, ropes, timing belts, and cables, depending in large part on the design and configuration of the rotating elements 2. If desired, the belts 6 may be grooved longitudinally or laterally. For example, the belts 6 may be grooved to correspond with the grooves in the sheaves 2. As another example, the belts may be laterally grooved (e.g. a compression belt or timing belt) when the rotating element is axially grooved (e.g. a timing wheel). When the rotating element is a sprocket, the drive element may be a chain with links that are configured to mate with the teeth on the sprocket. The drive element may be essentially any type of chain, including without limitation roller chains (bushed or bushingless) of the single-strand, multiple-strand, double-pitch and offset types.

In another embodiment as illustrated in FIG. 3, flexible conduit 12 is integrated into the integrally driven linkage 20 previously established in FIG. 1 by securing ready available conduit support blocks 13 and fasteners 14 to the outside links 5. In the illustrated embodiment, each mounting location includes a pair of conduit support blocks 13 that cooperatively close about the conduit 12. The support blocks 13 of the illustrated embodiment are secured to the outside link 5. For example, each outside link 5 may define a pair of tapped holes 60 (See FIG. 2) capable of receiving threaded fasteners 14 (See FIG. 3) that extend through and secure the inner support block 13 and the outer support block 13. This flexible conduit 12 provides a passage through which to deliver pneumatic, hydraulic or electrical utilities to enhance or control the secondary device being served. Interchanging the flexible conduit 12 with rigid conduit or similar medium (not shown) can create another configuration of the integrally driven linkage that permanently locks the linkage plates in the desired position, such as parallel to each other. These features can be added to one side or both sides of the integrally driven linkage 20. The support blocks 13 of the illustrated embodiment are merely exemplary and the conduit 12 may be secured to the linkage 20 by essentially any suitable alternative construction.

In another embodiment, the integrally driven linkage 20 as previously described in connection with FIG. 3 is incorporated into a practical application linking two devices for a conveyor system 100 illustrated in FIG. 4. The conveyor system shown is representative of a production area wherein a first stationary conveyor 16 (for example, chain driven live roller style) drive package is aligned horizontally at a certain elevation and leaving tolerance between the vertical alignment with the dynamic conveyor 17 mounted on a scissors lift mechanism 102 when in the raised position. FIG. 4 shows the scissor lift 102 is an at least partially lowered position as is evident from the horizontal misalignment between the two conveyors 16 and 17. In this embodiment, the scissor lift 102 may be raised to bring the dynamic conveyor 17 into alignment with or above the stationary conveyor 16. The integrally driven linkage 20 is attached to the frame 104 utilizing appropriate mounting brackets and the terminal ends are connected using appropriate belt/chain to both conveyors allowing the two devices to share the mechanical energy derived from the drive package on stationary conveyor 16. When the product is conveyed from stationary conveyor 16 to dynamic conveyor 17, mounted on the scissors lift 102, the integrally driven linkage 20 employs the mechanical energy via rotary motion powering the rollers on the slaved conveyor in unison with the driven conveyor. Then the dynamic conveyor 17 is lowered by the scissor lift 102 to the new height established by infield requirements. The integrally driven linkage 20 loop is able to articulate/flex in the manner for which it was designed while product flow remains in motion. If the flexible conduit 12 for electrical wiring, pneumatic or hydraulic hoses are applied they will flex in unison. Further, it makes no difference if product flow is reversed.

Though the above embodiment is described as pertaining to conveyor systems and lifting mechanisms, the integrally driven linkage of the present invention is not limited to these applications, and can instead be used across a range of applications where power and/or control is desired without use of individual drives. Applications can include industrial equipment, robotic devices, measuring devices and others.

In another embodiment shown in FIG. 5 clarifies the ability of a multi-link integrally driven linkage 20 configuration similar to FIG. 3 to serpentine around fixed obstructions. In this embodiment, outside links 5 have been designed to rigidly lock the inside links 1 in one direction and allow the linkage assemblage to bend in the opposite direction or even multiple directions by simply alternating (reversing) the installment of the inside links 1 and outside links 5. Having anchored a short section of the integrally driven linkage 20 to a fixed point with a mounting bracket 17 allows the remainder of the assemblage a degree of mobility. Therefore, any two devices that are attached to the termination ends of the integrally driven linkage 20 for the purpose of sharing a mechanical energy derived from a single drive will have the freedom to move vertically and linearly. For example, conveyors joined to either end of the linkage 20 of FIG. 5 can move up/down and toward/away from the fixed obstructions with the linkage articulating in real time to accommodate the motion. The bracket 17 provides a fixed location from which opposite ends sides of the linkage are capable of independent motion in both the vertical and lateral directions. By selectively orienting the inside links 1 and the outside links 5, the direction and degree of articulation in the linkage can be controlled.

In another embodiment as demonstrated in FIG. 6 of the integrally driven linkage 20 is used in a product handling transportation application. Starting with the basic building blocks established in FIG. 2 more advanced device configurations for the product handling industry can be implement. The FIG. 6 embodiment includes a stationary conveyor 15 and a dynamic conveyor 14 similar to FIG. 4. In this embodiment, the dynamic conveyor 14 is mounted to a scale unit 110 that will allow isolation of the scale unit. These two devices are arranged to share a single drive package using linkage 20.

Although the linkage is shown with inner and outer links, the present invention may be implemented using a range of alternative chain configurations. This may include essentially any conventional drive chain configuration. For example, instead of alternating inside and outside links, the chain may be an offset chain with a series of generally identical somewhat "Y"-shaped links.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. An integrally driven linkage having a longitudinal axis comprising:
    a plurality of link members,
    a plurality of substantially cylindrical axles interconnecting the link members, the link members being arranged along the longitudinal axis of a carrier into inner link members that are flanked on each side by outer link members, the outer link members extend between adjacent link members, a pair of apertures defined in each of the link members, the inner and outer link members being arranged such that they partly overlap with respective apertures in alignment, the inner and outer link members being interconnected by the transverse axles that are received in the aligned apertures, the inner link members each include a pair of opposed link plates that are received in the apertures of the inner link plates and serve to join together the opposed inner links, the axles being arranged so as to receive bearings upon which double sheaves may freely rotate, the axles being rotatable on the link members so as to allow the inner link members to articulate relative to the outer link members, the outer link members being configured so articulation is limited to one direction only.

2. An integrally driven linkage according to claim 1 wherein the axle closest to the driving end of the device and being arranged so as to receive bearings upon which a sheave is mounted which consists of a grooved single belt area and a single larger belt area.

3. An integrally driven linkage according to claim 2 wherein the axle closest to the driving end of the device and being arranged so as to receive bearings upon which a combination sheaves/sprockets may be used.

4. An integrally driven linkage according to claim 1 wherein electrical cables, pneumatic hoses, and hydraulic hoses may be attached to the outer links enable the energy carrier to act as a standard cable carrier external to the sheave arrangement.

5. An integrally driven linkage comprising:
    a plurality of links arranged in a series, each link having a pivotal connection to at least one adjacent link, whereby the linkage is capable of articulating at said pivot connections;
    a plurality of rotating elements supported by said links, each of said rotating elements being supported at a fixed distance from at least one adjacent rotating element; and
    a plurality of drive elements operatively coupling adjacent rotating elements, wherein at least one rotating element receives power from an adjacent rotating element by an input drive element and transmits power to an adjacent rotating element by an output drive element.

6. The integrally driven linkage of claim 5 wherein said plurality of links includes an alternating arrangement of inside links and outside links.

7. The integrally driven linkage of claim 6 further including a plurality of axles, each of said rotating elements rotatably supported on a corresponding axle.

8. The integrally driven linkage of claim 7 wherein each rotation element includes a two-stage pulley having a drive pulley and a driven pulley, said drive pulley and said driven pulley being mechanically connected so that rotation of one pulley results in rotation of the other.

9. The integrally driven linkage of claim 8 wherein said driven pulley of a first rotation element is coupled to said drive pulley of a second rotation element by a first drive element and said drive pulley of said first rotation element is coupled to said driven pulley of a third rotation element by a second drive element.

10. The integrally drive linkage of claim 9 wherein said drive element is a belt.

11. The integrally driven linkage of claim 7 wherein each rotation element includes a two-stage sprocket having a drive sprocket and a driven sprocket, said drive socket and said driven socket being mechanically connected so that rotation of one sprocket results in rotation of the other.

12. The integrally driven linkage of claim 11 wherein said driven sprocket of a first rotation element is coupled to said drive sprocket of a second rotation element by a first drive element and said drive sprocket of said first rotation element is coupled to said driven sprocket of a third rotation element by a second drive element.

13. The integrally driven linkage of claim 12 wherein said drive element is a chain.

14. The integrally driven linkage of claim 5 further including a first transition rotating element at a first end of said linkage and a second transition rotating element at a second end of said linkage.

15. The integrally driven linkage of claim 5 wherein said links are configured to mechanically limit articulation of said linkage.

16. The integrally driven linkage of claim 15 wherein said inside links have an inside bridge section and said outside links have an outside bridge section, said inside bridge sections and said outside bridge sections configured to selectively abut to limit articulation of said linkage.

17. The integrally driven linkage of claim 5 including a conduit mounted to a plurality of said links, said conduit defining a passageway.

18. The integrally driven linkage of claim 17 wherein said conduit is secured to said linkage by a plurality of mounting blocks.

19. A integrally driven linkage comprising:
a chain including a plurality of links arranged in a series;
a plurality of axles support by the links;
a plurality of rotating elements, each of said rotating elements being rotatably supported on a corresponding one of said axles, each of said rotating elements configured to receive a first drive element operatively coupling said rotating element to an adjacent upstream rotating element and a second drive element operatively coupling said rotating element to an adjacent downstream rotating element;
an input transition assembly having a rotating element operatively coupled to a drive source and operatively coupled to an adjacent downstream rotating element; and
an output transition assembly having a rotating element operatively coupled to a target destination and operatively coupled to an adjacent upstream rotating element.

20. The linkage of claim 19 wherein said plurality of links includes an alternating arrangement of inside links and outside links, said axles extending through and pivotally joining said inside links and said outside links.

21. The linkage of claim 20 wherein said inside links include a pair of inside plates and an inside bridge section joining said inside plates.

22. The linkage of claim 21 wherein said outside links include a pair of outside plates and an outside bridge section joining said outside plates.

23. The linkage of claim 19 wherein said rotating elements are at least one of pulleys, sheaves and sprockets.

24. The linkage of claim 23 wherein said drive elements are at least one of belts, chains, ropes and cables.

25. The linkage of claim 22 wherein said inside links and said outside links are configured so that said bridge sections are capable of abutting to limit articulation of said linkage in at least one direction.

26. The linkage of claim 25 wherein said inside links and said outside links are reversible to selectively limit articulation of said linkage in one direction or another.

* * * * *

UNITED STATES PATENT AND TRADEMARK OFFICE
CERTIFICATE OF CORRECTION

PATENT NO. : 10,113,622 B2
APPLICATION NO. : 15/451480
DATED : October 30, 2018
INVENTOR(S) : Jerome H. Morris et al.

Page 1 of 1

It is certified that error appears in the above-identified patent and that said Letters Patent is hereby corrected as shown below:

In the Claims

Column 11, Claim 10, Line 7:
"drive linkage" should be --driven linkage--

Column 11, Claim 11, Line 11:
"socket" should be --sprocket--

Column 11, Claim 11, Line 12:
"socket" should be --sprocket--

Signed and Sealed this
Twenty-second Day of January, 2019

Andrei Iancu
*Director of the United States Patent and Trademark Office*